(12) United States Patent
Gradischnig

(10) Patent No.: US 7,046,692 B1
(45) Date of Patent: May 16, 2006

(54) NODE SUPPORTING LINKS HAVING THE ABILITY TO TRANSFER LONGER MESSAGES THAN ACCORDING TO CURRENT MTP LEVEL 2

(75) Inventor: Klaus Gradischnig, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/367,580

(22) PCT Filed: Feb. 16, 1998

(86) PCT No.: PCT/EP98/00677

§ 371 (c)(1),
(2), (4) Date: Aug. 17, 1999

(87) PCT Pub. No.: WO98/36582

PCT Pub. Date: Aug. 20, 1998

(30) Foreign Application Priority Data

Feb. 17, 1997 (EP) .................................. 97102527

(51) Int. Cl.
*H04J 3/16* (2006.01)
*H04J 3/22* (2006.01)
*G06F 15/173* (2006.01)

(52) U.S. Cl. ...................... 370/467; 370/469; 370/522; 709/242

(58) Field of Classification Search ........ 370/248–252, 370/351–392, 395, 410, 467–469, 522, 466; 709/242–245; 379/219–230, 242–246
See application file for complete search history.

(56) References Cited

U.S. PATENT DOCUMENTS

| 5,268,895 | A | | 12/1993 | Topper | |
|---|---|---|---|---|---|
| 5,327,421 | A | * | 7/1994 | Hiller et al. | 370/395 |
| 5,365,524 | A | * | 11/1994 | Hiller et al. | 370/376 |
| 5,481,673 | A | * | 1/1996 | Michelson | 709/242 |
| 5,535,200 | A | * | 7/1996 | Gardner | 370/410 |
| 5,544,154 | A | * | 8/1996 | Glitho | 370/248 |
| 5,550,914 | A | * | 8/1996 | Clarke et al. | 379/230 |
| 5,583,848 | A | * | 12/1996 | Glitho | 370/248 |
| 5,615,213 | A | * | 3/1997 | Griefer | 370/412 |
| 5,650,998 | A | * | 7/1997 | Angenot et al. | 370/225 |
| 5,721,728 | A | * | 2/1998 | Fowler et al. | 370/250 |
| 5,748,636 | A | * | 5/1998 | Gradischnig | 370/395.2 |
| 5,799,317 | A | * | 8/1998 | He et al. | 707/104 |
| 5,905,724 | A | * | 5/1999 | Carson et al. | 370/385 |
| 5,915,013 | A | * | 6/1999 | Mintz et al. | 379/230 |
| 5,926,482 | A | * | 7/1999 | Christie et al. | 370/469 |
| 5,991,301 | A | * | 11/1999 | Christie | 370/395 |
| 6,002,693 | A | * | 12/1999 | Hahn | 370/466 |
| 6,023,474 | A | * | 2/2000 | Gardner et al. | 370/467 |
| 6,061,364 | A | * | 5/2000 | Hager et al. | 370/467 |

(Continued)

OTHER PUBLICATIONS

Trends of signalling protocol evolution in ATM networks, Gradischnig, pp. 310-314.

(Continued)

*Primary Examiner*—Man U. Phan
(74) *Attorney, Agent, or Firm*—Bell, Boyd & Lloyd LLC

(57) ABSTRACT

A node, which supports enhanced link sets, which includes two signaling point codes such that one of the signaling point codes is used to identify functions and MTP users which can make full use of a longer and unsegmented message length (i.e., in excess of 255 octets) which heretofore had to be segmented before being delivered to link sets supporting only messages according to Q.703.

6 Claims, 4 Drawing Sheets

U.S. PATENT DOCUMENTS 6,081,525 A * 6/2000 Christie et al. ............. 370/392
6,115,380 A * 9/2000 Christie et al. ............. 370/395
6,154,467 A * 11/2000 Hager et al. ................ 370/467
6,163,546 A * 12/2000 Sipila ......................... 370/466
6,175,574 B1 * 1/2001 Lewis ......................... 370/522
6,181,703 B1 * 1/2001 Christie et al. ............. 370/410
6,456,629 B1 * 9/2002 Bjorkqvist et al. ......... 370/466

OTHER PUBLICATIONS

Signalling in the ATM network, Law, pp. 93-107.
A High-performance Implementation of Signalling System No. 7 based on ATM technology, Honing, pp. 305-309.

* cited by examiner

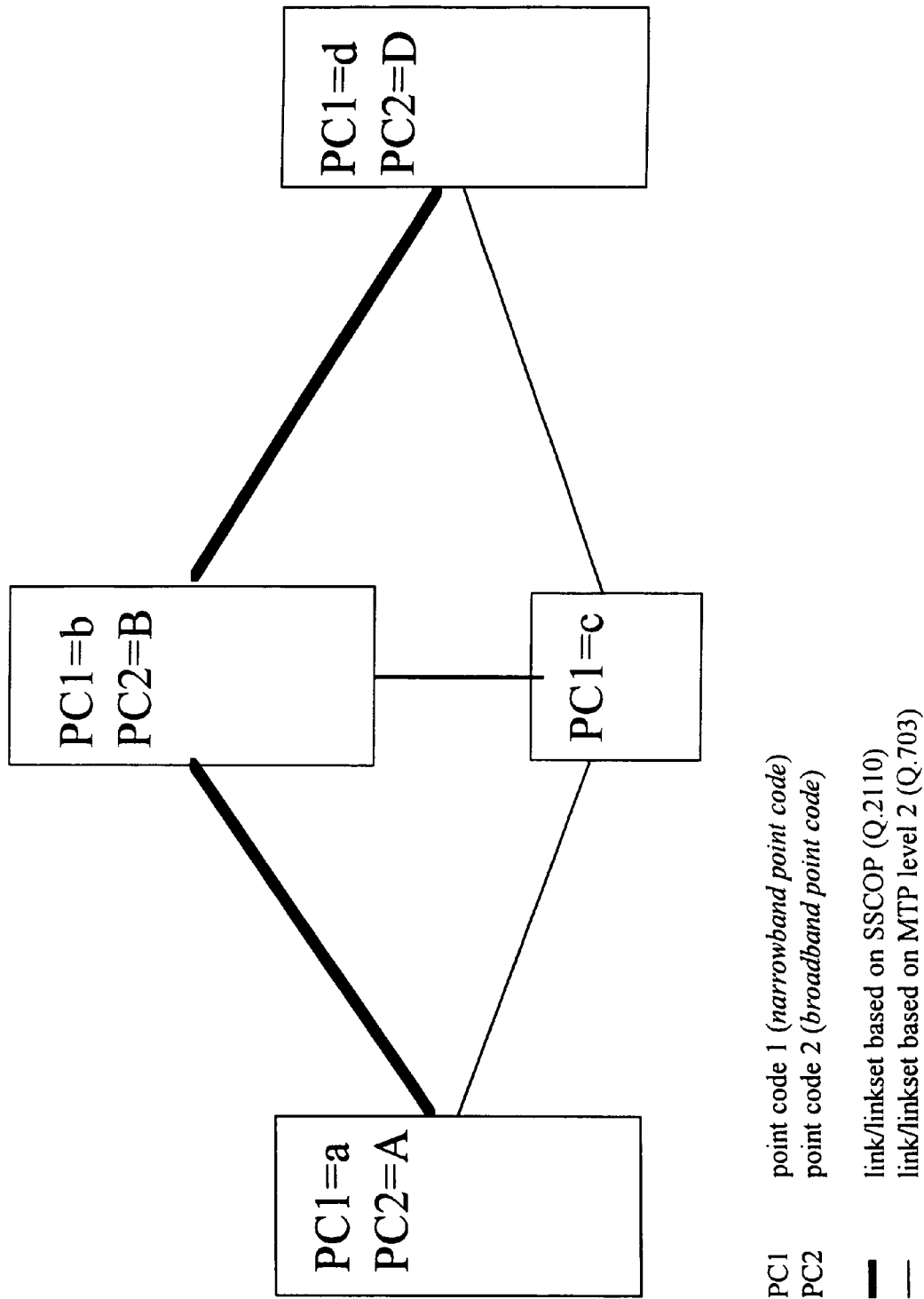

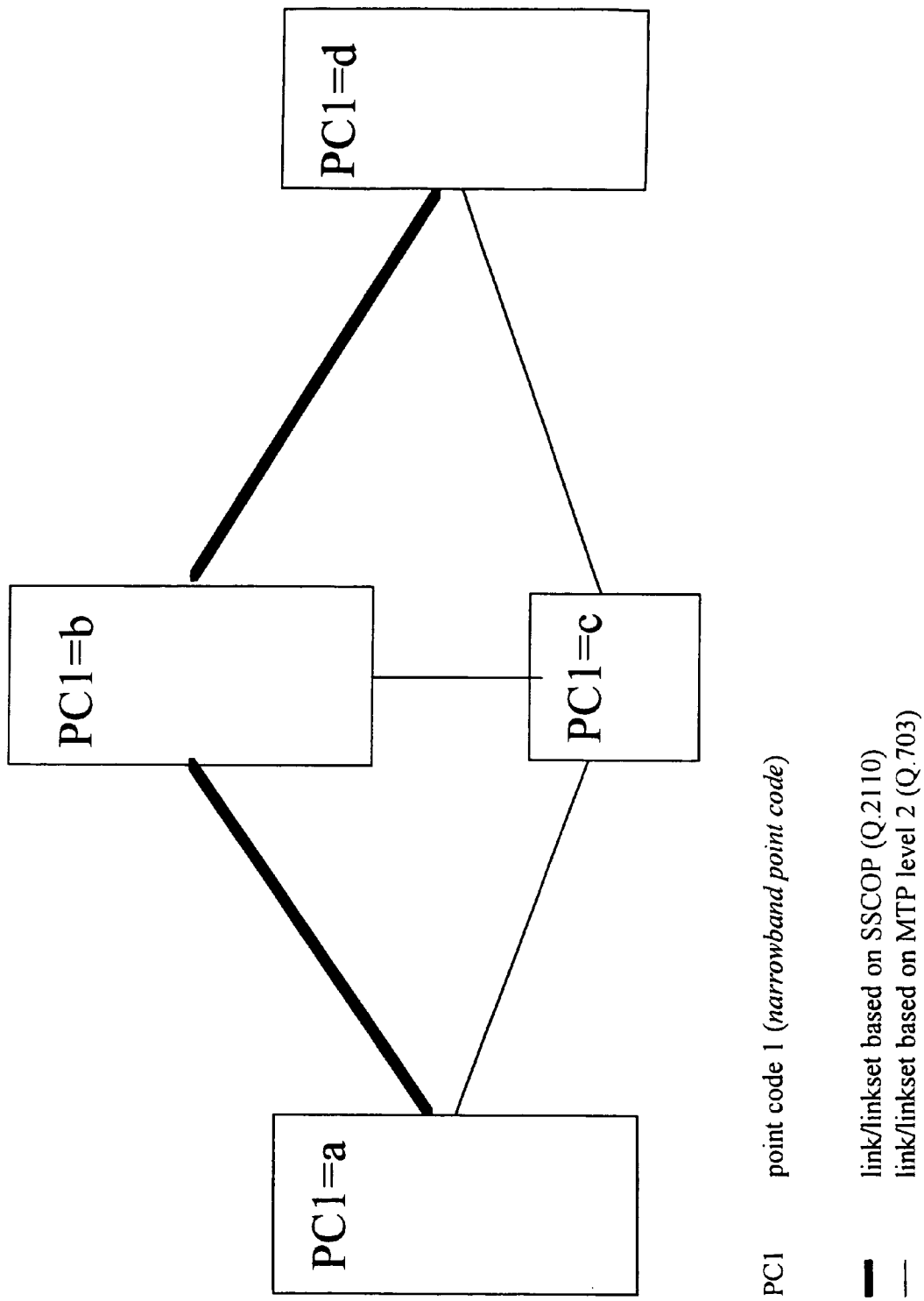
Figure 3 - logical network for short messages

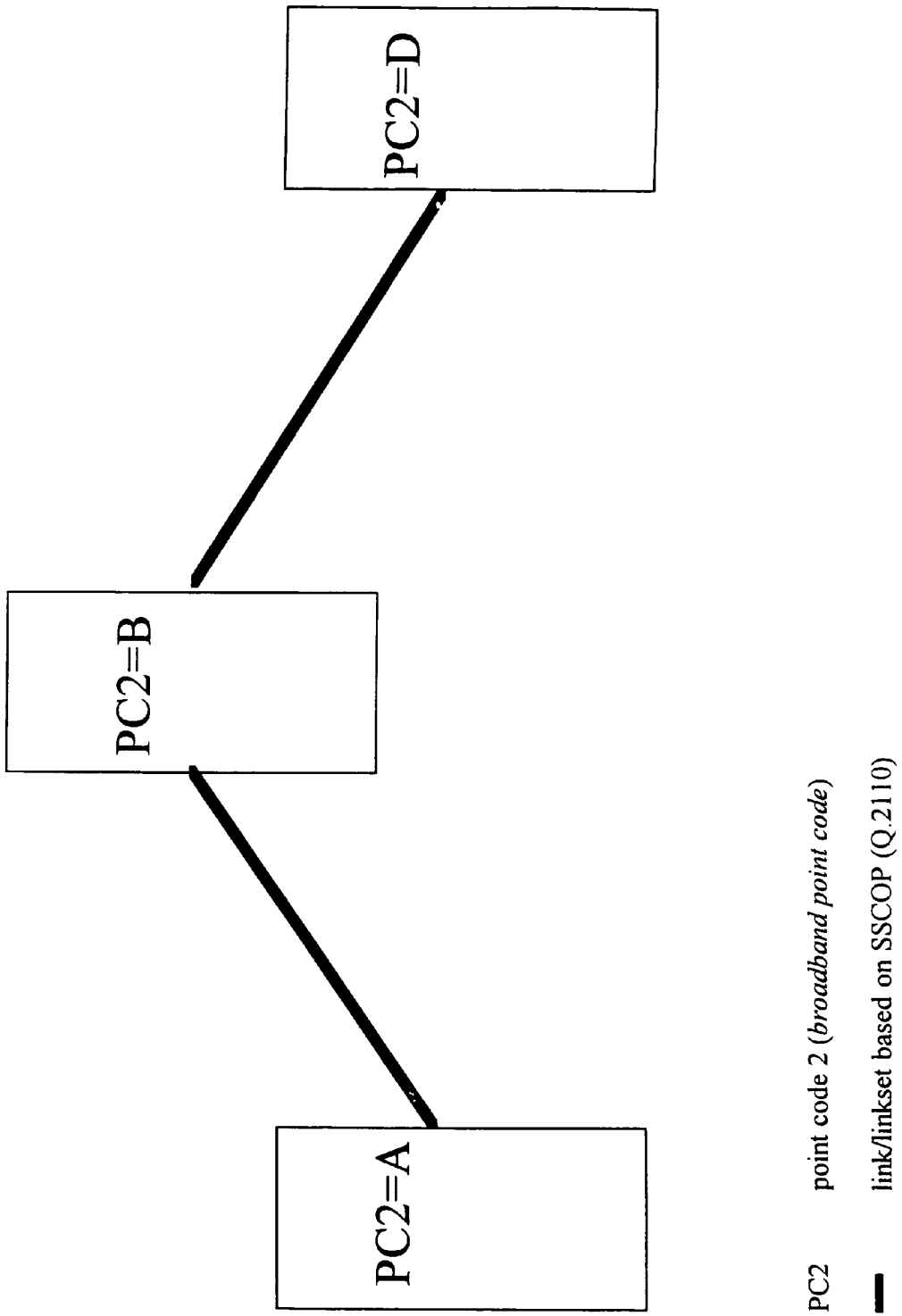
Figure 4 - logical network supporting long messages
PC2  point code 2 (*broadband point code*)
⎯  link/linkset based on SSCOP (Q.2110)

NODE SUPPORTING LINKS HAVING THE ABILITY TO TRANSFER LONGER MESSAGES THAN ACCORDING TO CURRENT MTP LEVEL 2

BACKGROUND OF THE INVENTION

1. Field of the Invention

The present invention relates to a node, which supports enhanced link sets, having the ability to transfer longer messages than according to current MTP level 2, wherein the node includes, in addition to a standard first point code, a second point code which enables the full use of the longer message length.

2. Description of the Prior Art

FIG. 1 shows the various protocol stacks for SS7 (Signalling system no: 7) up to the MTP (message transfer part) level. Five stacks are currently defined. The first stack is the well known stack for operation on 56/64 kbit/s links.

Due to an increased bandwidth delay product, the MTP level 2 (Q.703) is not ideally suited for speeds significantly above 64 kbit/s. The elements which are problematic are window size, retransmission strategy, and the error rate monitor.

Three different protocol stacks have been defined for use on T1/E1 links (1.5/2 MBit/s) which address some or all of these problematic elements.

The latest edition of Q.703 contains, as a national option, a modification to the level 2 protocol which introduces 12 bit sequence numbers and a different error rate monitor (second column). Otherwise, the procedures are not changed.

Recommendation Q.2119 defines frame-relay framing for SSCOP (Service specific connection oriented protocol, Q.2110) to be used on a raw E1/T1 link (third stack). Thus, starting at SSCOP, the complete broadband protocol stack can be used on high speed signalling links.

In addition, Bellcore defines the complete ATM signalling protocol stack starting at the ATM layer for use on T1 signalling links, with certain restrictions in the ATM layer, like not allowing multiple VCs (virtual channels) on a T1 link (column 4).

Lastly, the full ATM signalling protocol stack (column 5) also could be used in narrowband networks.

Besides the potentially vastly different link speeds (which, however, pose no new interworking problems), the main difference between MTP level 2 based and SSCOP based signalling lies in the different maximum MSU length supported.

Of course, there is no need to actually make use of the longer MSU length supported by the ATM links in an enhanced narrowband signalling network. Indeed, the existing narrowband SS7 user parts would not even make use of the longer MSU length. We note, however, that the users of the SCCP can generate messages in excess of 255 octets (the maximum data size supportable in single messages of the pre-96/97 SCCP). Such messages will be segmented before being delivered to the MTP. If such traffic would go via ATM links, avoiding the segmentation would benefit performance significantly. Therefore, the situation exists that use of the larger MSU sizes—where needed and when possible—would be an additional welcome benefit of using the enhanced linksets.

Each node in an MTP network is identified by one signalling point code. An MTP network is identified by the so-called network indicator in an MTP message. Routing in the MTP is based on the so-called destination (signalling) point code (DPC) which identifies the destination of a message signalling unit (MSU) in an MTP network. In addition, the signalling link selection field (SLS) can be used do select between available routes of equal priority (combined linksets) and to select a specific link within a linkset (a collection of links directly connecting two signalling points). No other information (like origination, MTP user, or MSU length) is generally evaluated for routing in the MTP.

The SCCP augments the MTP routing by providing additional functions to route on a so-called global title (GT), which can e.g. be a subscriber number of an 800-number. An SCCP routing on GT performs a process called global title translation (GTT) which derives the DPC of the final destination or the DPC of the next node (intermediate translator node) where the GT is further analyzed, eventually leading to the DPC of the final destination.

In addition to the GT the SCCP uses a so-called subsystem number (SSN) to identify the addressed SCCP user in the final destination.

This process also allows an SCCP message to cross MTP network boundaries.

In addition, the outcome of a GTT can depend on the availability status of the (next) destination. If the so-called primary destination, which would normally be the result of a GTT, or the addressed SSN is not available or reachable, an alternative destination can be the result of the GTT. This allows the SCCP to route messages to backup destinations (or backup intermediate translator nodes). Loadsharing between destinations is, in principle, also a possibility. Between two SCCP nodes the messages are routed by the MTP using the DPC provided by the SCCP.

State of the Art

The interworking problem arising if use of longer messages in networks containing also linksets supporting only short messages is to be made has not been addressed in any detail. Bellcore simply specifies that long messages destined for an MTP level 2 based link are to be discarded and that other routing should be administrated accordingly.

A similar solution is proposed for the MTP based narrowband-broadband interworking in Q.2210. For the SCCP, the possibility is defined to convert long LUDT(S) messages into segmented short XUDT(S) messages.

All these solutions, however, require appropriate planning of the routes supporting the longer messages and/or will not make optimal use of the capabilities available. An MTP level 3 protocol based approach to solve such problem is described in Q.701. This solution, however, is incomplete.

This invention proposes to use the addressing mechanisms provided in MTP and SCCP to solve, or rather prevent, the above-described interworking problem.

SUMMARY OF THE INVENTION

Accordingly, in an embodiment of the present invention, a node is provided which supports enhanced links and which has the ability to transfer longer messages than according to current MTP level 2, wherein the node includes first and second signaling point codes such that the second point code is used to identify functions and MTP users which can make full use of the longer message length and both the first and second point codes are part of the same MTP network.

In an embodiment, the node further includes MTP routing tables which support the enhanced links, wherein the routing tables are structured so that routing between nodes with the second point code use only the enhanced links.

In an embodiment, the node further includes SCCP translation functions which support the enhanced links, the SCCP translation functions being engineered such that primary translation is to logical destinations reachable via the enhanced links and backup translation is to logical destinations reachable via links based on MTP level 2 if translation results in a physical destination located in a node supporting the enhanced links.

In a further embodiment of the present invention, the first and second point codes are part of different MTP networks.

Additional features and advantages of the present invention are described in, and will be apparent from, the Detailed Description of the Preferred Embodiments and the Drawing.

DESCRIPTION OF THE DRAWINGS

FIG. 2 shows an example of a network in accordance with the present invention which includes first and second point codes;

FIG. 3 shows a logical network for short messages in accordance with the present invention; and FIG. 4 shows a logical network supporting long messages in accordance with the present invention.

DETAILED DESCRIPTION OF THE PREFERRED EMBODIMENTS

Figure 1:
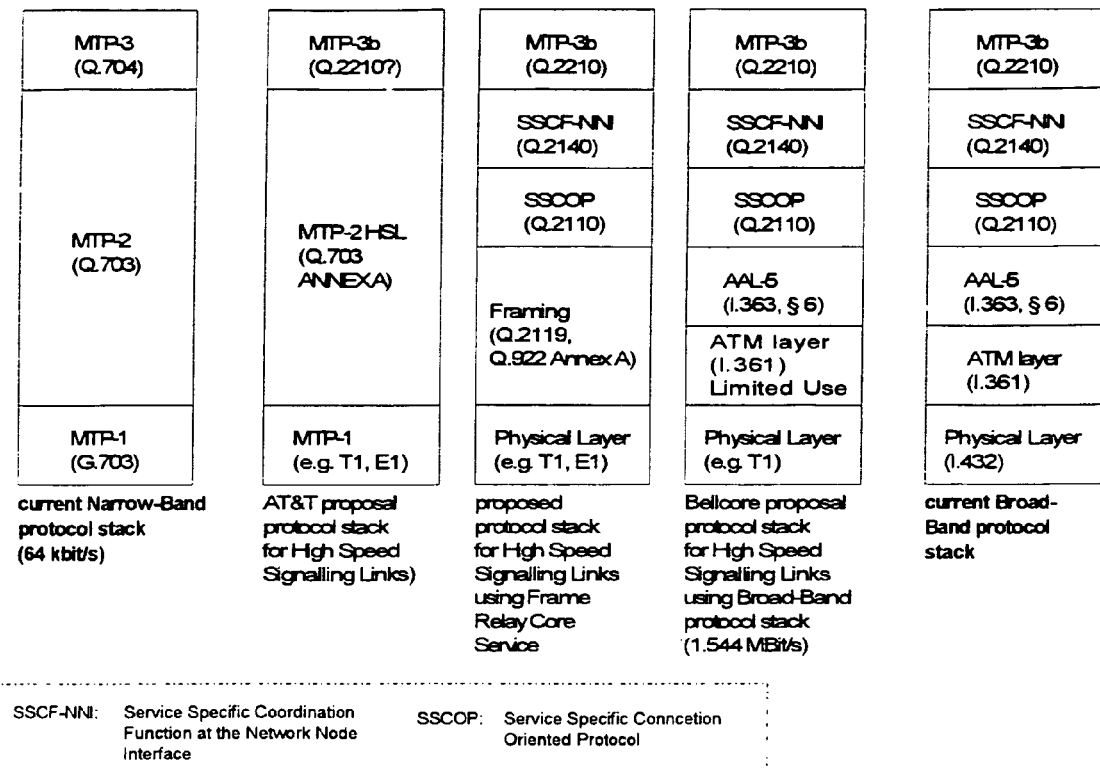
FIG. 1 shows the various protocol stacks for SS7 up to the MTP level.

In accordance with the present invention, each node, which supports linksets having the ability to transfer longer messages than according to Q.703 (for example SSCOP-linksets), is assigned a second point code (in addition to its narrowband point code), which will be called broadband pointcode, identifying its enhanced functions; i.e., those which can generate long messages. An example of such a network is given in FIG. 2. Routing tables in the MTP are engineered so that these broadband signalling points are only connected via linksets supporting the longer message length (see Tables 1 through 3, for example). Non-enhanced nodes would have no knowledge about the broadband point codes in the MTP network (see Tables 5, for example). For the interconnection of the narrowband point codes and the non-enhanced nodes (i.e., the nodes having only narrowband point codes) all linksets, however, would be available.

Thus the nodes supporting the enhanced links (nodes identified also by the broadband signalling point codes) together with the enhanced linksets would form an overlay network which can transport longer messages (see FIG. 3). Even nodes having only the enhanced linksets would be identified by a narrowband and a broadband point code.

It is, however, still possible for the SCCP to reach a node (having a narrowband and a broadband point code) to which no enhanced route is currently available by appropriately engineering the SCCP GT translation data if this should be desired by the operator of the network. GT translation in the SCCP of a node having a narrowband and a broadband point code is engineered so that physical destinations (intermediate translators or final destinations) having a narrowband and a broadband point code have the broadband point code as the primary translation result and the narrowband point code as the backup translation result (see Table 4).

As long as two signalling points are connected, an enhanced route will be used. If all enhanced routes between two nodes having a narrowband and a broadband point code fail, communication between the nodes will be via the linksets supporting only short messages, using the narrowband point codes as addresses.

In addition, this solution also can be used for any new MTP users or appropriately modified existing MTP users like ISUP. Similarly, this solution also is suitable for interworking between narrowband and broadband signalling networks.

Note that an alternative solution would be to use a different network indicator for the enhanced part of the signalling network which would have the advantage that there would be no restrictions in the available address space for point codes.

Although the present invention has been described with reference to specific embodiments, those of skill in the art will recognize that changes may be made thereto without departing from the spirit and scope of the invention as set forth in the hereafter appended claims.

TABLE 1

MTP routing table in node a/A without link failure

| destination | next node | |
|---|---|---|
| b | b | c |
| B | B | |
| c | c | b |
| d | b | c |
| D | B | |

TABLE 2

MTP routing table in node a/A with link A to B failed
short messages can still reach all nodes via c

| destination | next node | |
|---|---|---|
| b | | c |
| B | | |
| c | c | |
| d | | c |
| D | | |

TABLE 3

MTP routing table in node a/A with link C–D failed
long messages to D not possible anymore

| destination | next node | |
|---|---|---|
| b | b | c |
| B | B | |
| c | c | b |
| d | b | c |
| D | | |

TABLE 4

SCCP global tile translation in node a/A for
GT resulting in addressing the SCCP (or one of its users) in node d/D

| primary result (MTP address) | backup result (MTP address) |
|---|---|
| D (long message allowed) | d (segmentation required) |

TABLE 5

MTP routing table in node c without link failure

| destination | next node | |
|---|---|---|
| a | a | b |
| b | b | |
| d | d | b |

The invention claimed is:

1. A node in an MTP network for providing enhanced links, comprising:
 a first destination point code assigned to said node for connecting to a first link for supporting short messages, wherein said short messages have a message length that is supported by a MTP level 2 signaling link; and
 a second destination point code assigned to said node for connecting to a second link for supporting long messages, wherein said long messages have a message length that exceeds a length supported by the MTP level 2 signaling link, and wherein said long messages have a maximum length that is supported by SSCOP, wherein both the first and second destination point codes are part of the same MTP network.

2. A node as claimed in claim 1, further comprising MTP routing tables supporting the enhanced links, wherein the routing tables are structured such that routing between nodes with the second destination point code uses only the enhanced links.

3. A node as claimed in claim 1, further comprising SCCP translation functions supporting the enhanced links, the SCCP translation functions being engineered such that primary translation is to be logical destinations reachable via the enhanced links and backup translation is to be logical destinations reachable via links based on MTP level 2 if translation results in a physical destination located in a node supporting the enhanced links.

4. A node in an MTP network for providing enhanced links, comprising:
 a first destination point code assigned to said node for connecting to a first link for supporting short messages, wherein said short messages have a message length that is supported by a MTP level 2 signaling link; and
 a second destination point code assigned to said node for connecting to a second link for supporting the long messages, wherein said long messages have a message length that exceeds a length supported by the MTP level 2 signaling link, and wherein said long messages have a maximum length that is supported by SSCOP,
 wherein both the first and second point codes are part of different MTP networks.

5. A node as claimed in claim 4, further comprising MTP routing tables supporting the enhanced links, wherein the routing tables are structured such that routing between nodes with the second destination point code uses only the enhanced links.

6. A node as claimed in claim 4, further comprising SCCP translation functions supporting the enhanced links, the SCCP translation functions being engineered such that primary translation is to be logical destinations reachable via the enhanced links and backup translation is to be logical destinations reachable via links based on MTP level 2 if translation results in a physical destination located in a node supporting the enhanced links.

* * * * *